Patented Nov. 18, 1952

2,618,574

UNITED STATES PATENT OFFICE 2,618,574

SURFACES OF PLASTICS COATED WITH INK CONTAINING A CHLORINATED OR CHLOROSULFONATED POLYMER OF ETHYLENE

Albert A. Pavlic, Wilmington, Del., assignor to E. I. du Pont de Nemours and Company, Wilmington, Del., a corporation of Delaware No Drawing. Application July 15, 1949, Serial No. 105,051

4 Claims. (Cl. 117—38)

This invention relates to inks, and more particularly, to a special ink which may be scribed or stamped on plastics generally and especially on those having a waxy surface. The ink is likewise applicable for use in printing generally on paper, cardboard, and other ink receptive surfaces.

The plastic industry with its variety of intricate shapes of bars, rods, sheets, molded articles and the like, has been in need for some time of a suitable ink for printing, scribing, stamping or otherwise applying monograms, trade-marks, and other indicia on these materials. This need is particularly urgent in the marking of plastic materials of the more wax-like polymers such as those produced from the polymers of ethylene, from the chlorinated and chlorosulfonated polymers thereof, from polyisobutylene and from other plastic materials having similar surface characteristics. Due to the wax-like smooth surface of these plastics, ordinary inks are wholly unsuitable for permanently marking or applying pictorial or other designs directly on them.

An object of the present invention is to provide an ink particularly useful for marking the surface of smooth plastic materials. Another object of the invention is to provide an ink for general use having new and improved properties. Still another object is to provide writing, rotogravure, intaglio, printing or lithographic inks which contain as one of their principal ingredients a polymer or interpolymer of ethylene, or a chlorinated or chlorosulfonated product thereof. Other objects and advantages of the invention will hereinafter appear.

The above and other objects are accomplished in accord with the invention by the preparation of an ink containing a hydrocarbon polymer or interpolymer, or one that has been chlorinated or chlorosulfonated and more especially such modified polymers or interpolymers of ethylene. These inks may be prepared generally by the usual methods of preparing ink compositions such, for example, as by compounding one of the aforesaid polymers with a pigment and/or dryer and/or solvent, the compounding being accomplished by preparing a homogeneous composition or suspension by solution, grinding, milling and/or other suitable means.

Modified polymer containing inks with unusual properties particularly for printing, scribing, stamping or otherwise marking waxy surfaces are prepared from chlorinated hydrocarbon polymers or chlorosulfonated hydrocarbon polymers. The chlorinated hydrocarbon polymers may be prepared in accord with the process described in U. S. Patent 2,398,803 of J. R. Myles et al. issued April 23, 1946 while the chlorosulfonated polymers may be prepared in accord with the process described in McAlevy et al. U. S. Patent 2,416,060 issued February 18, 1947. Other suitable processes may be used for preparing the chlorinated or chlorosulfonated hydrocarbon polymers from ethylene polymers, polyisobutylene, hydrogenated rubber, butadiene homopolymers or its copolymers with styrene or copolymers with the acrylate esters. While the preferred inks of the invention are prepared from the chlorinated and chlorosulfonated hydrocarbon polymers and especially from such polymers of ethylene, inks can likewise be prepared from the polymers and interpolymers of ethylene used alone or in conjunction with the chlorinated or chlorosulfonated polymers described above. Mixtures of these modified or unmodified polymers may likewise be used.

The ink contains, in addition to the aforesaid polymers and/or modified polymers, a pigment and if a black indicia is desired, preferably lamp black is incorporated in the composition of the ink although other blacks such as cobalt black or aniline black may be substituted for lamp black. If a colored indicia is desired any appropriate colored pigment or dye may be alternatively employed. In addition to the pigment, a mineral bonding agent and/or filler is in some instances advantageously added and more particularly one having a good covering power such as titanium oxide or a less opaque filler and pigment such as white lead or calcium sulfate.

The ink may be made in the form of a solution of the modified polymer in a suitable solvent, the amount of solvent being regulated to give the desired consistency. Alternatively the ink may be prepared in the form of an emulsion of the polymer or modified polymer in water or other satisfactory non-solvent of the modified polymer. Inks in the form of pastes and semi-solids may likewise be formed by increasing the ratio of polymer to solvent.

The examples which follow illustrate embodiments of the invention in which parts are by weight unless otherwise stated.

*Example 1.*—Titanium oxide pigment to the extent of about 5 parts by weight was blended by stirring into 50 parts of a 10% solution of a chlorinated polymer of ethylene in toluene. This viscous mass was then placed on a porous stamp pad and with a rubber stamp the surface of a film of ethylene polymer was marked. As soon as impressions were made the film was placed in an oven at a temperature of 65° C. and baked for one-half an hour. A film of ethylene polymer was likewise printed and allowed to dry at room temperatures. The dried ink, in both instances, had good adhesion to the polymer of ethylene and good resistance to smearing.

*Example 2.*—A 40% emulsion containing 80 parts by weight of a chlorosulfonated polymer of ethylene and 20 parts by weight of Synvaren 631, a liquid phenolic resin, was diluted with water to a solids content of about 20% and pigmented by the addition of about 40 parts by weight of titanium dioxide. This ink was printed on a film of ethylene polymer with a rubber stamp and as soon as the impressions were made the film was placed in a 65° C. oven and baked for 15 minutes. The resulting print had good adhesion to the polymer of ethylene and good resistance to smearing.

Table I illustrates further modifications of the invention and shows several types of plastic films and paper printed with inks prepared substantially in accord with the process of Examples 1 and 2.

The amount of solvent employed is determined, inter alia, by the particular ink that is to be manufactured. For the preparation of a printing, stamping or intaglio type ink a high consistency is demanded in order that the ink may remain sufficiently fluid to adhere to the roller or pad, on the one hand, and be readily transferred by stamp, platen or other surface to the article being marked. Usually for such purposes from 2 to 8% solvent by weight is sufficient, which solvent is incorporated by solution in the modified polymer, with or without heating. On the other hand, if a writing fluid is to be prepared the concentration of the solvent may be increased up to 25 or 35% by weight.

Drying temperatures for the ink, after its application, will be determined in accord with the particularly type and variety of ink compositions employed but generally a temperature between 50 and 90° C. will be ample to dry quickly and to a tackless and resistant surface in a matter of 30 minutes or less. Room temperature

*Table I*

| Resin | Solvent | | | | | Coloring | | | | Transfer Method | | Substrate | | | | Drying Temp. | |
|---|---|---|---|---|---|---|---|---|---|---|---|---|---|---|---|---|---|
| | Emulsion—Solids | Toluene | Ethyl Acetate | Cyclohexanone | Methylethyl ketone | Oil Red Dye | TiO₂ Pigment | Water Dye | Carbon Black | Pen Writing | Stamp Printing | Polythene Film | Polythene Coated Card | Polyvinyl Chloride Film | Paper | 25° C. | 65° C. |
| | Pct. | Pct. | Pct. | Pct. | Pct. | Pct. | Pct. | Pct. | Pct. | | | | | | | | |
| A-20% | 20 | | | | | | 10 | | | | X | X | | | | X | X |
| A-10% | | 80 | | | | | 10 | | | | X | X | | | | X | X |
| B-20% | 20 | | | | | | | 2 | | | X | X | | | | X | |
| B-20% | 20 | | | | | | 10 | | | | X | X | | | | X | |
| B-20% | 20 | | | | | | | 2 | | | X | X | | | | X | |
| B-10% | | 90 | | | | 2 | | | | | X | X | | | | | X |
| B-5% | | 95 | | | | 2 | | | | X | X | X | X | X | X | X | |
| B-10% | | 20 | 70 | | | 2 | | | | | X | X | | | | X | |
| B-10% | | 20 | | 70 | | 2 | | | | | X | X | | | | X | |
| B-10% | | 80 | | | | | | | 10 | | X | X | | | | X | |
| B-10% | | 80 | | | | | 10 | | | | X | X | | | | X | X |
| B-25%+DHAP—12% | | | | | 62 | 2 | | | | | X | X | | | | X | |
| B-25%+DHAP—12% | | | 50 | | 12 | 2 | | | | | X | X | | | | X | |
| B-12%+DHAP—6% | | | | 50 | 30 | 2 | | | | | X | X | | | | X | |
| B-5%+Vistanex—5% | | 90 | | | | 2 | | | | | X | X | | | | X | |
| B-16%+Phenolic Resin—4% | 20 | | | | | | 10 | | | | X | X | | | | | X |

A = Chlorinated polythene, 30% chlorine.
B = Chlorosulfonated polythene, 27.7% Cl, 1.5% S.
DHAP = Dihydro abietyl phthalate—a commercial product obtained from Hercules Powder Co.
Vistanex = Polyisobutylene, mol. wt. = 60,000.
Phenolic resin = Synvaren 631, liquid phenolic resin.

In addition to the solvents described in the examples and in the foregoing table other solvents may be used, such, for example, as carbon tetrachloride, the halogenated hydrocarbons generally, such, for example, as trichlorethylene, perchlorethylene, as well as such solvents as benzene, xylene, cyclohexane and isopropyl acetate.

The degree of chlorination of the chlorinated hydrocarbon or of the chlorosulfonated hydrocarbon has a marked influence on the solubility of the modified hydrocarbon. When used with certain solvents best results are realized when the present chlorine content of the modified ethylene polymer is that of Table II.

*Table II*

| Solvent | Percent Cl |
|---|---|
| Carbon tetrachloride | 30–50. |
| Cyclohexane | 20–30. |
| Cyclohexanone | 20–75. |
| Isopropyl acetate | 40–50. |
| Methyl ethyl ketone | 40–50. |
| Xylene | 20–50, 60–70 (poor solubility at 50–60% Cl.). | drying may be used if desired and especially if highly volatile solvents are employed.

If a pigment is used to provide the color or to give a black ink it may be ground into the polymer before or after the latter has been put in solution although it is preferable to add the pigment and effect a homogeneous mixture of it with the modified polymer prior to solution. The amount of pigment incorporated into the ink composition will in each instance be governed, by and large, by the type of pigment used and the intensity of color desired in the finished ink. In place of a pigment the well known ink colors may be incorporated and when such colors are employed a mutual solvent for the modified polymer and the color will facilitate incorporation. Alippa galls or the other black coloring materials described above may be used to provide black and blue-black inks while the colored inks may be provided by incorporating organic dyes or inorganic metal salts of the desired color into the ink composition.

Any suitable method may be used for the preparation of emulsions of chlorinated or chlorosulfonated polymers of ethylene. This method may be used. Two hundred parts of the chlorosulfonated polymer of ethylene is dissolved in 250 parts of toluene and the solution added with thorough mixing in a Fred Waring Blendor to an aqueous solution of 210 parts of water containing 6 parts of polyvinyl alcohol, 3 parts of Tween, a non-ionic dispersing agent consisting of a polyethylene glycol derivative of a hydrogenated rosin ester. After the emulsion has been formed the toluene is stripped out of the solution on a steam bath at a pressure of about 100 mm. to a solid content of approximately 40%.

The rate of drying, viscosity, tack and stringiness of the ink is controlled, by and large, by the choice of solvent employed, for example cyclohexanone permits higher concentrations of chlorosulfonated polymer of ethylene with higher viscosity and less tack. Other solubility factors are of importance in the practice of the invention. Benzene, toluene, xylene and the chlorinated hydrocarbons pucker a film of a polymer of ethylene when applied directly because of rapid penetration. Other less effective solvents, such as methyl ethyl ketone and isopropyl acetate do not cause puckering of the ethylene polymer film. This effect, probably caused by the rate of dissipation of the solvent through the polymer of ethylene, is a factor that should be considered when preparing printing inks where the surface of the print is not open to free evaporation or at least open only a relatively short period of time. The rate of drying by evaporation is of course controlled by volatility of the solvent. Consequently, the presence of a small amount of a solvent, such as toluene or carbon tetrachloride, greatly increases the amount of the chlorine or chlorosulfonated polymer that can be tolerated by the less effective solvents and aid in controlling the viscosity of the resulting inks.

I claim:

1. A solid polymer of ethylene surface which displays an indicia containing a substituted hydrocarbon polymer of the group consisting of chlorinated and chlorosulfonated polymers of ethylene.

2. A solid polymer of ethylene, the surface of which is printed with a marking composition containing a substituted hydrocarbon polymer of the group consisting of chlorinated and chlorosulfonated polymers of ethylene and a color.

3. A solid polymer of ethylene printed with an ink containing a chlorinated polymer of ethylene and a pigment.

4. A solid polymer of ethylene surface printed with an ink containing a chlorosulfonated polymer of ethylene and a pigment.

ALBERT A. PAVLIC.

REFERENCES CITED

The following references are of record in the file of this patent:

UNITED STATES PATENTS

| Number | Name | Date |
|---|---|---|
| 2,416,060 | McAlevy et al. | Feb. 18, 1947 |
| 2,422,919 | Myles et al. | June 24, 1947 |
| 2,467,875 | Andrews | Apr. 19, 1949 |
| 2,480,007 | Fletcher | Aug. 23, 1949 |
| 2,561,064 | Ness | July 17, 1951 |

FOREIGN PATENTS

| Number | Country | Date |
|---|---|---|
| 560,168 | Great Britain | Mar. 23, 1944 |

OTHER REFERENCES

American Ink Maker—October 1947, pages 34–35.